(12) United States Patent
Couwenhoven et al.

(10) Patent No.: US 6,435,657 B1
(45) Date of Patent: Aug. 20, 2002

(54) METHOD FOR MULTICOLORANT PRINTING OF DIGITAL IMAGES USING REDUCED COLORANT AMOUNTS

(75) Inventors: Douglas W. Couwenhoven; Rodney L. Miller, both of Fairport; Kevin E. Spaulding, Spencerport, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/933,498

(22) Filed: Aug. 20, 2001

(51) Int. Cl.[7] .................................................. B41J 2/21
(52) U.S. Cl. ......................................................... 347/43
(58) Field of Search .............................. 347/43, 14, 15

(56) References Cited

U.S. PATENT DOCUMENTS

| | | | |
|---|---|---|---|
| 4,930,018 A | 5/1990 | Chan et al. | |
| 5,012,257 A | 4/1991 | Lowe et al. | |
| 5,515,479 A | 5/1996 | Klassen | |
| 5,563,985 A | 10/1996 | Klassen et al. | |
| 5,663,662 A | 9/1997 | Allen et al. | |
| 5,795,082 A | * 8/1998 | Shimada et al. | 400/120.09 |
| 5,872,896 A | 2/1999 | Li et al. | |
| 6,338,538 B1 | * 1/2002 | Toshiaki | 347/15 |

* cited by examiner

Primary Examiner—Thinh Nguyen
(74) Attorney, Agent, or Firm—Raymond L. Owens

(57) ABSTRACT

A method for modifying an input image suitable for printing on a digital printer having two or more colorants, wherein at least two of the colorants are similar having substantially the same color but different densities, to form an output image with pixels representing modified colorant amounts subject to a total colorant amount limit.

15 Claims, 6 Drawing Sheets

METHOD FOR MULTICOLORANT PRINTING OF DIGITAL IMAGES USING REDUCED COLORANT AMOUNTS

CROSS REFERENCE TO RELATED APPLICATIONS

Reference is made to commonly assigned U.S. patent application Ser. No. 09/455,981 filed Dec. 6, 1999 by Couwenhoven et al., and commonly assigned U.S. patent application Ser. No. 09/881,460 filed Jun. 14, 2001 by Couwenhoven et al., the disclosures of which are herein incorporated by reference.

FIELD OF THE INVENTION

This invention pertains to the field of digital imaging, and more particularly to a colorant reduction method used in the process of printing a digital image.

BACKGROUND OF THE INVENTION

In the field of digital printing, a digital printer receives digital data from a computer and places colorant on a receiver to reproduce the image. A digital printer may use a variety of different technologies to transfer colorant to the page. Some common types of digital printers include inkjet, thermal dye transfer, thermal wax, electrophotographic, and silver halide printers.

Often when printing digital images, undesirable image artifacts may result when an excessive amount of colorant is placed in a small area on the page. These image artifacts degrade the image quality, and can result in an unacceptable print. In the case of an inkjet printer, some examples of these image artifacts include bleeding, cockling, banding, and noise. Bleeding is characterized by an undesirable mixing of colorants along a boundary between printed areas of different colorants. The mixing of the colorants results in poor edge sharpness, which degrades the image quality. Cockling is characterized by a warping or deformation of the receiver that can occur when printing excessive amounts of colorant. In severe cases, the receiver may warp to such an extent as to interfere with the mechanical motions of the printer, potentially causing damage to the printer. Banding refers to unexpected dark or light lines or streaks that appear running across the print, generally oriented along one of the axes of motion of the printer. Noise refers to undesired density or tonal variations that can give the print a grainy appearance, thus degrading the image quality. Although these artifacts are presented in the context of an inkjet printer, it is known to those skilled in the art that similar artifacts commonly exist with the other above mentioned printing technologies also.

State of the art inkjet printers designed for printing digital images sometimes utilize additional light density colorants to provide for improved image quality in the highlight regions of the image. In highlight regions, individual dots are routinely encountered, and if printed with a high density ink, these dots can be visible and objectionable to the observer. Using a lighter density ink in these highlight regions reduces the visibility of the individual dots so that the observer can no longer perceive them as distinct dots, thereby improving the image quality. However, such printers still require a high density ink to achieve acceptable density in shadow regions of the image. Thus, a typical combination of inks used in a high quality inkjet printer is the traditional cyan, magenta, yellow, and black (CMYK) inks plus additional light cyan and light magenta inks, indicated by lowercase "cm", (i.e., CMYKcm). In these printers, the above mentioned problems associated with using excess colorant become worse, as the total amount of ink used is typically greater than for a standard CMYK printer.

In many inkjet printers, satisfactory density and color reproduction can generally be achieved without using the maximum possible amount of colorant. Therefore, using excessive colorant not only introduces the possibility of the above described image artifacts occurring, but is also a waste of colorant. This is disadvantageous, since the user will get fewer prints from a given quantity of colorant. It has been recognized in the art that the use of excessive colorant when printing a digital image needs to be avoided. Generally, the amount of colorant needed to cause image artifacts (and therefore be considered excessive) is receiver, colorant, and printer technology dependent. Many techniques of reducing the colorant amount are known for CMYK printers in which a halftoning process is used (typically inside a software printer driver program) to convert input digital image data into binary "on" or "off" states at each pixel. In such printers, the input image to the halftoning process is a higher bit precision image, typically 8 bits (or 256 levels) per pixel, per color.

U.S. Pat. No. 4,930,018 to Chan et al. teaches a method of reducing paper cockle and graininess of inkjet prints utilizing multiple inks with different dye loadings. In this method, a given grey level can be reproduced a variety of different ways, some of which will use more colorant than others. The different ways to reproduce a given grey level are rank ordered according to the total ink coverage, and a selection is made by iterating through the order until one is found that satisfies a specified maximum coverage limit.

U.S. Pat. No. 5,515,479 to Klassen et al. teaches a method for reducing marking material (i.e., ink) coverage in a printing process by determining the ink coverage for each pixel in an image, determining if too much ink will be placed on the page in a given area, and reducing the amount of ink to an acceptable level by turning "off" a fraction of the pixels in the given area. The determination of which pixels to turn off is made by using a processing order through each area which tends to randomize the turn off effect. While this method successfully reduces the amount of ink placed on the page in a given area, it can introduce pattern noise into the image because of the processing order method of selecting which pixels to turn off. Also, the pixels that are turned off in each color separation are not correlated, which can lead to a grainy appearance to an image region that should appear otherwise uniform.

U.S. Pat. No. 5,563,985 to Klassen addresses the problem of pattern noise by selecting which pixels to turn off in response to a random number function. While this method successfully eliminates pattern noise that can be generated in a given area, it can introduce random noise into the image because the selection of which pixels to turn off is determined by a random process. While this may be visually less objectionable than pattern noise, it is still not optimal.

U.S. Pat. No. 5,012,257 to Lowe et al. describes a "superpixel" printing strategy to reduce bleed across color field boundaries. This strategy limits printing to no more than two drops of ink per cell or pixel, and no more than a total of three drops per superpixel, where a superpixel consists of a 2×2 array of pixel cells. This strategy controls bleed, but at a penalty in terms of color and spatial resolution.

The above mentioned references teach methods of reducing artifacts associated with excessive colorant usage by utilizing methods that operate on the digital data after halftoning. That is, the above techniques operate primarily on bitmaps of binary image data where each pixel is represented by a code value of 0 ("off", meaning no colorant), or 1 ("on", meaning fall colorant). At this point in the imaging chain of a digital printer, much image information has been lost due to the halftoning process, and accurately controlling the total colorant amount becomes more costly and less accurate relative to a pre-halftoning algorithm. U.S. Pat. No. 5,633,662 to Allen et al. teaches a method of reducing colorant using a pre-halftoning algorithm that operates on higher bit precision data (typically 256 levels, or 8 bits per pixel, per color).

U.S. Pat. No. 5,872,896 to Li et al. teaches a pre-halftone ink limiting algorithm in which pixels that exceed the total ink limit are depleted to values that are generally substantially less than the total ink limit. The reason for this is to prevent a many to one mapping that can occur if all pixels greater than the total ink limit are mapped to the total ink limit. This is a similar concept to what is done in color gamut mapping, where colors outside the gamut are mapped to colors substantially inside the gamut boundary to make room for other colors that are further outside the gamut.

While the above mentioned references may provide acceptable ink limiting for inkjet printers with CMYK colorants, they are not optimal solutions for a printer with CMYKcm colorants.

Thus, there is a need for a colorant reduction algorithm which can be applied to a multicolorant printer utilizing both dark and light density colorants to provide for high quality images.

SUMMARY OF THE INVENTION

It is an object of the present invention to provide a method for printing high quality digital images that are free of the above described artifacts associated with using excessive amounts of colorant.

It is a further object of the present invention to provide a method for reducing the amount of colorant used to print an image on a multicolorant printer in which dark and light density colorants are used.

Yet another object of the present invention is to provide a method for reducing the amount of colorant used to print an image on a multicolorant printer in which dark and light density colorants are used such that the perceived color is substantially unchanged.

These objects are achieved by a method for a method for modifying an input image having an (x,y) array of pixels suitable for printing on a digital printer having two or more colorants, wherein at least two of the colorants are similar having substantially the same color but different densities, and wherein each pixel has input code values representing input colorant amounts of said two or more colorants, to form an output image with pixels representing modified colorant amounts subject to a total colorant amount limit, comprising the steps of:

a) determining a total input colorant amount for a pixel responsive to the input colorant amounts of said two or more colorants;

b) determining modified colorant amounts for the similar colorants responsive to the input colorant amounts, the total input colorant amount, and the total colorant amount limit such that a first colorant amount is removed from a lower density similar colorant and a second colorant amount less than the first colorant amount is added to a higher density similar colorant; and c) repeating steps a) and b) for each pixel in the input image.

ADVANTAGES

The present invention has an advantage over the prior art in that it provides for reducing the amount of colorant used to print a digital image on an inkjet printer having light and dark density colorants. Another advantage of the present invention is that the perceived color of the digital image is substantially preserved in the colorant reduction process wherever possible. Yet another advantage of the present invention is that the total amount of colorant is reduced without increasing the noise or graininess of the image. Still another advantage of the present invention is that the total amount of colorant is more accurately controlled relative to many of the prior art methods, providing for improved control over image artifacts associated with using excess colorant.

DETAILED DESCRIPTION OF THE INVENTION

This invention describes a method for reducing the amount of colorant used in printing a digital image to avoid undesirable image artifacts that degrade the image quality of a digital print. The invention is presented hereinafter in the context of an inkjet printer. However, it should be recognized that this method is applicable to other printing technologies as well.

An input image is composed of a two dimensional (x,y) array of individual picture elements, or pixels, and can be represented as a function of two spatial coordinates, (x and y), and a color channel coordinate, c. Each unique combination of the spatial coordinates defines the location of a pixel within the image, and each pixel possesses a set of input code values representing input colorant amounts for a number of different inks indexed by the color channel coordinate, c. Each input code value representing the amount of ink in a color channel is generally represented by numbers on the range $\{0,255\}$. A typical set of inks for an inkjet printer consists of cyan (C), magenta (M), yellow (Y), black (K), light cyan (c), and light magenta (m) inks, hereinafter referred to as CMYKcm inks. While the cyan and magenta color channels are typically represented by a lower density colorant (light cyan or light magenta) and a higher density colorant (cyan or magenta) ink, the other inks may have lower and higher density versions present as well. One example of this is an inkjet printer that has several different density versions of a black colorant to use in reproducing high quality monochrome prints, such as are typically used in medical imaging. Although the present invention will be described in the context of an inkjet printer with CMYKcm inks, the invention can be applied to other printer technologies and colorants as well, provided those technologies use multiple (at least two) colorants which are similar, having substantially the same color but different densities, containing at least one lower density colorant and one higher density colorant. In the context of an inkjet printer, the colorant amounts will be described in terms of ink volume, but one skilled in the art will recognize that other metrics may be more convenient for computing the colorant amount for different printing technologies. One example of this may be describing the colorant amount in an electrophotographic printer as the mass of toner that is used.

Figure 1:
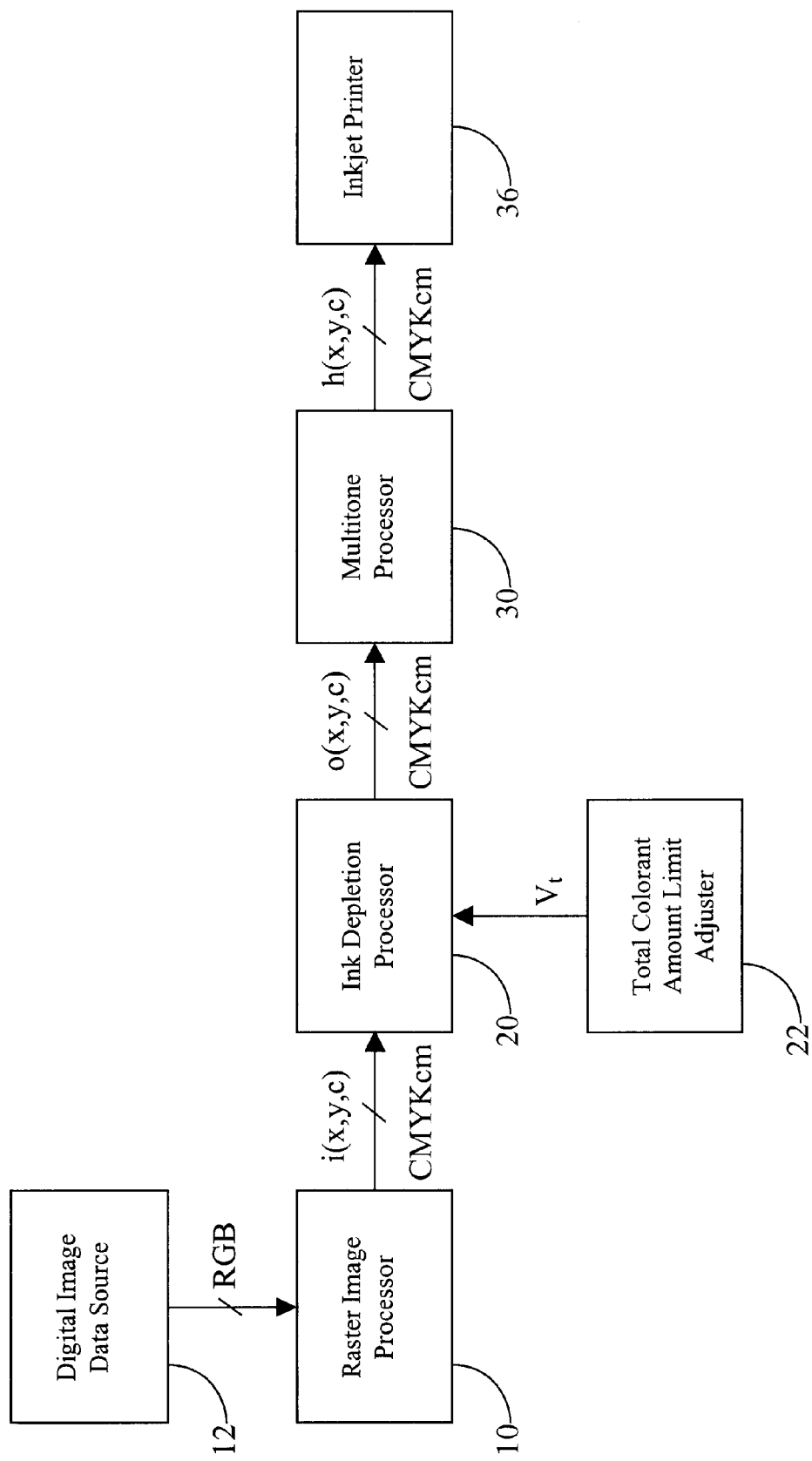
FIG. 1 is a flow diagram showing placement of the ink depletion processor in an inkjet printer or printer driver.

Referring to FIG. 1, a generic image processing algorithm chain is shown for an inkjet printer in which a raster image processor 10 receives digital image data in the form of an input image from a digital image data source 12 which may be a host computer, network, computer memory, or other digital image storage device. The raster image processor 10 applies imaging algorithms to produce a processed digital image signal having input code values $i(x,y,c)$, where x,y are the spatial coordinates of the pixel location, and c is the color channel coordinate. In one embodiment of the present invention, c has values 0, 1, 2, 3, 4, or 5 corresponding to C, M, Y, K, c, or m color channels, respectively. The types of imaging algorithms applied in the raster image processor 10 typically include sharpening (sometimes called "unsharp masking" or "edge enhancement"), color conversion (converts from the source image color space, typically RGB, to the CMYKcm color space of the printer), resizing (or spatial interpolation), and others. The imaging algorithms that are applied in the raster image processor 10 can vary depending on the application, and are not fundamental to the present invention. In a preferred embodiment of the present invention, the color conversion step implemented in the raster image processor 10 includes a multidimensional color transform in the form of an ICC profile as defined by the International Color Consortium's "File Format for Color Profiles," Specification ICC.1A:1999-04. The ICC profile specifies the conversion from the source image color space (typically RGB) to an intermediate CMYK color space. This conversion is then followed by a conversion from CMYK to CMYKcm preferably according to the method disclosed in commonly assigned U.S. patent application Ser. No. 09/455, 981 filed Dec. 6, 1999 by Couwenhoven et al., the disclosure of which is herein incorporated by reference.

Following the raster image processor 10 of FIG. 1 is an ink depletion processor 20, which receives the input code value $i(x,y,c)$ and a total colorant amount limit, and produces a depleted image signal having output code values $o(x,y,c)$ representing modified colorant amounts. The ink depletion processor 20 performs the function of reducing the total colorant amount (per pixel, or per unit area) below a total colorant amount limit $V_t$ to prevent image artifacts from occurring. The total colorant amount limit $V_t$ is produced by a total colorant amount limit adjuster 22. The total colorant amount limit $V_t$ is determined to ensure that high quality images are produced that are free from the artifacts discussed above. The process of determining an appropriate value for the total colorant amount limit $V_t$ is typically performed by printing a test image with color patches having different total colorant amounts, and then selecting the patch with the highest total colorant amount that is free from image artifacts. Factors such as the specific ink, media, and printer parameters will generally affect the value of $V_t$, as will environmental conditions such as the temperature and relative humidity. The total colorant amount limit $V_t$ is typically the same for each pixel in the image. The implementation of the ink depletion processor 20 is the main subject of the present invention, and will be described hereinafter.

Still referring to FIG. 1, the ink depletion processor 20 is followed by a multitone processor 30 which receives the output code value $o(x,y,c)$ and produces a multitoned image signal $h(x,y,c)$. The multitone processor 30 performs the function of reducing the number of bits used to represent each image pixel to match the number of printing levels available in the printer. Typically, the output code value $o(x,y,c)$ will have 8 bits per pixel (per color), and the multitone processor 30 generally reduces this to 1 to 3 bits per pixel (per color) depending on the number of available printing levels. The multitone processor 30 may use a variety of different methods known to those skilled in the art to perform the multitoning. Such methods typically include error diffusion, clustered-dot dithering, or stochastic (blue noise) dithering. The particular multitoning method used in the multitone processor 30 is not fundamental to the present invention, but it is required that the ink depletion processor 20 which includes the present invention is implemented prior to the multitone processor 30 in the imaging chain. Finally, an inkjet printer 36 receives the multitoned image signal $h(x,y,c)$, and deposits ink on the page accordingly to produce the desired image.

Figure 2:
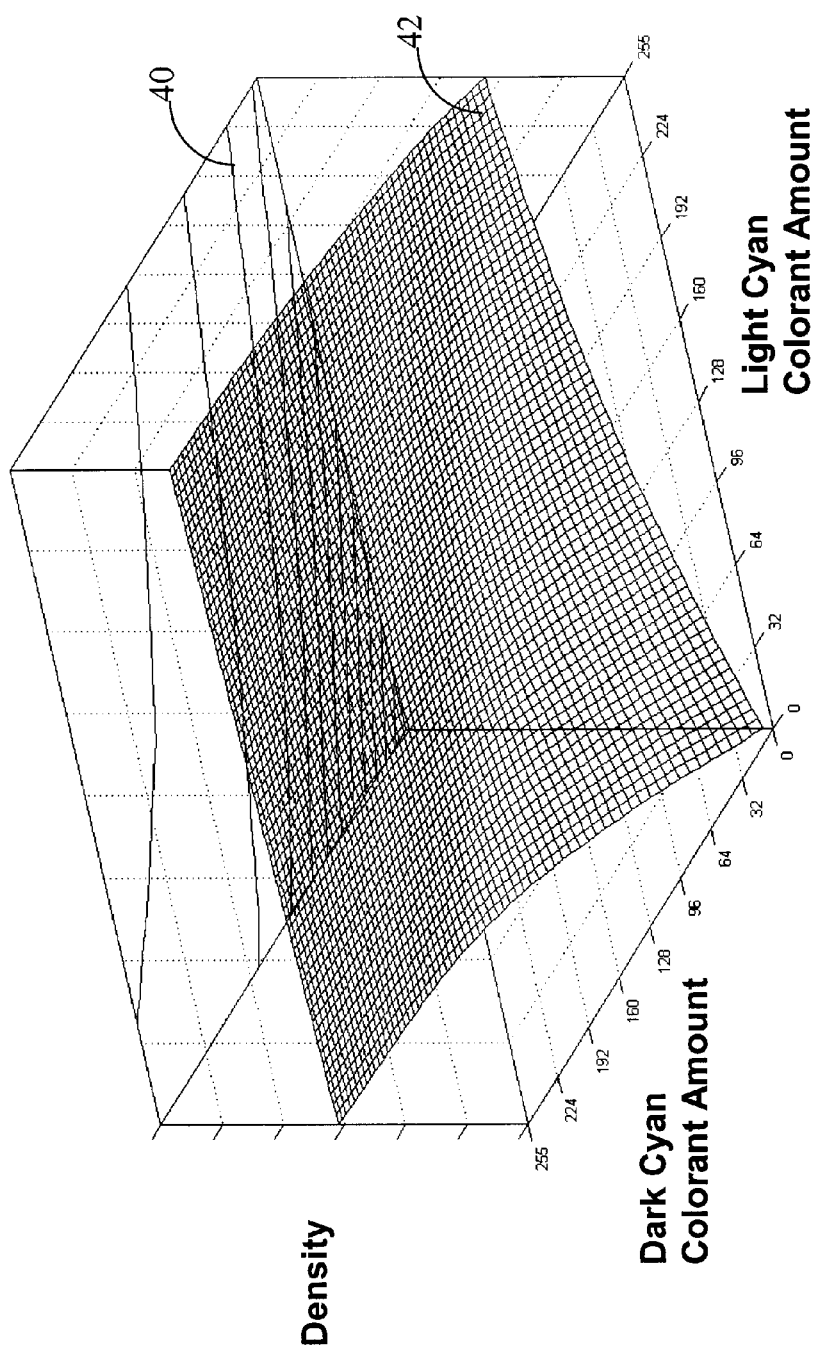
FIG. 2 is a three dimensional plot showing the measured density of light and dark cyan ink overprints for a multi-colorant printer.

Turning now to the three dimensional (3D) plot shown in FIG. 2, the optical density that is measured from an inkjet print of color patches having various combinations of light and dark cyan colorant is plotted as a 3D wireframe mesh 42. The light cyan colorant amount varies along one axis of the plot, and the dark cyan colorant amount varies along another. In this plot, the light and dark cyan colorant amounts are specified as digital code values on the range {0,255}. In addition to the 3D wireframe mesh 42 showing the density surface, a set of density contours 40 is also shown (vertically separated from the wireframe mesh for clarity) to provide a two dimensional (2D) representation of the slope of the density surface. Each line in the set of density contours 40 therefore represents a path of constant density on the density surface.

Figure 3:
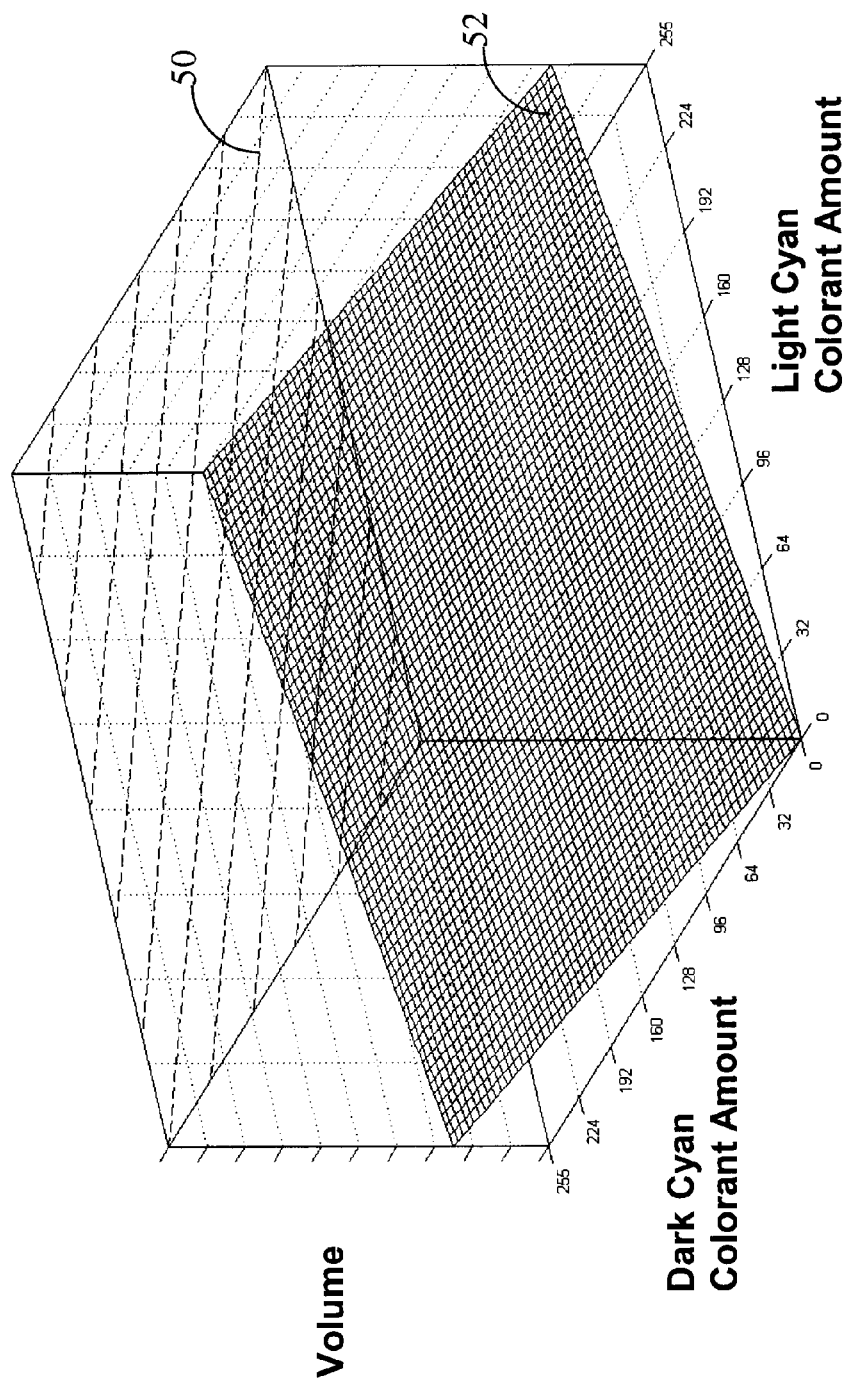
FIG. 3 is another three dimensional plot showing the ink volume of light and dark cyan ink overprints for a multi-colorant printer.

Referring now to FIG. 3, a similar 3D plot shows the ink volume that corresponds to various combinations of light and dark cyan colorant plotted as a 3D wireframe mesh 52. A set of ink volume contours 50 is shown (again, vertically separated from the wireframe mesh for clarity) to provide a 2D representation of the slope of the ink volume surface. Thus, each line in the set of ink volume contours 50 represents a path of constant ink volume on the ink volume surface. In a preferred embodiment of the present invention applied to a CMYKcm inkjet printer, similar data as shown in FIG. 2 and FIG. 3 would be collected for the light and dark magenta channels as well, and this information would be used in an identical fashion as the light and dark cyan channels. Thus, only the light and dark cyan inks will be used for illustration.

Figure 4:
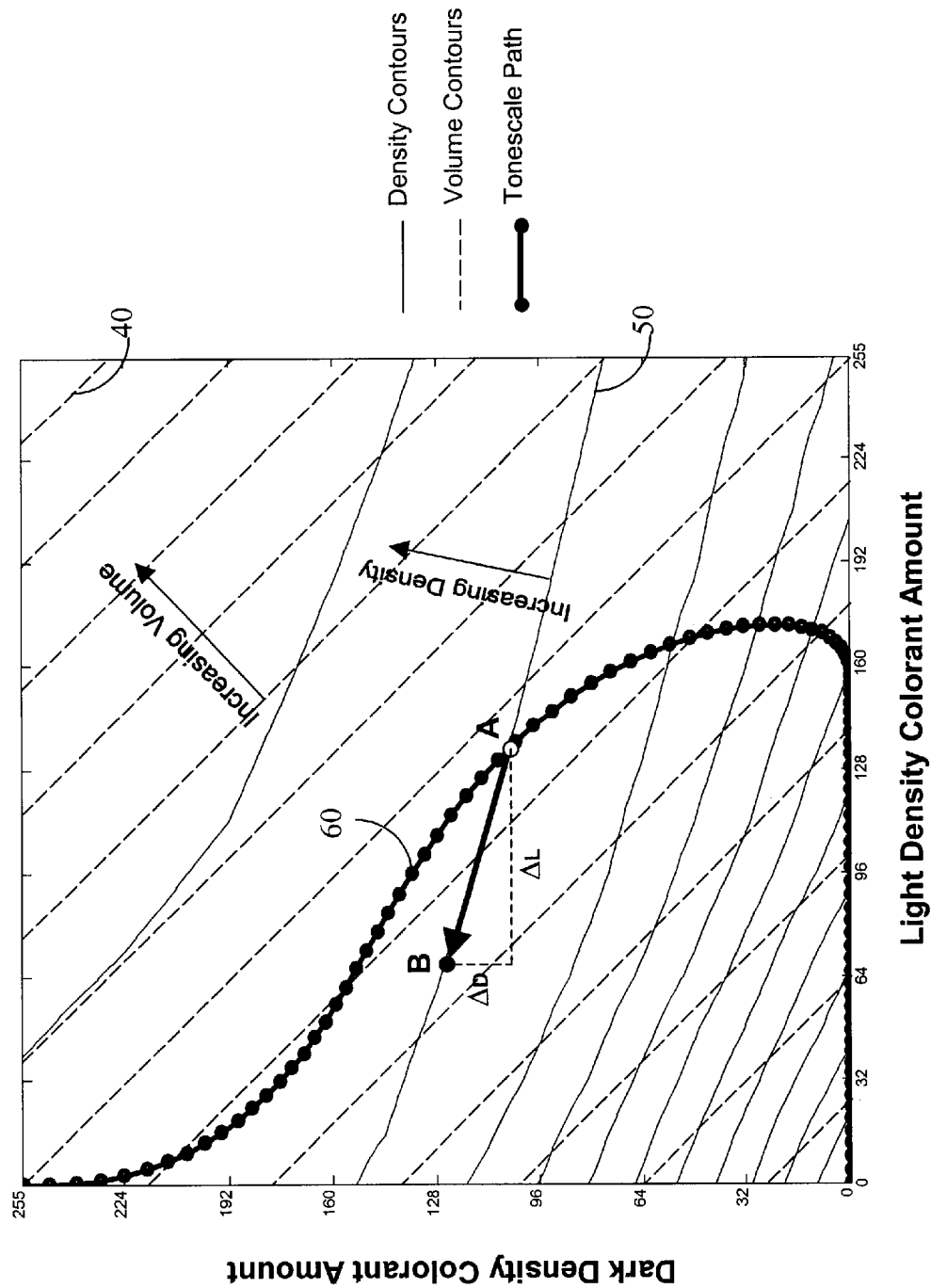
FIG. 4 is a graph showing ink volume and density contours plotted against the light and dark density colorant amounts, and showing an example of ink depletion according to the present invention.

Turning now to FIG. 4, an implementation of the ink depletion processor 20 of FIG. 1 according to a preferred embodiment of the present invention will be described. In this graph, the density contours 40 of FIG. 2 and the ink volume contours 50 of FIG. 3 are plotted on top of each other, along with a cyan tonescale path 60. Arrows labeled "increasing volume" and "increasing density" are shown to indicate which direction is "uphill" on the corresponding contours.

To understand the significance of the cyan tonescale path 60, consider a CMYKcm inkjet printer that is used to print a color gradation ramp where the color varies smoothly from white to a saturated, maximum density cyan color. Theoretically, this color gradation ramp would only contain light and dark cyan inks, and the other colorants would be absent. The amount of light and dark cyan ink that gets printed at each point along the color gradation ramp is controlled by the selection of the cyan tonescale path 60. Typically, the cyan tonescale path 60 is created such that light cyan ink is added in increasing amounts as the color progresses away from white, then the dark cyan ink is added to reproduce the darker cyan colors. The topic of optimal light and dark ink usage and the particular shape of the cyan tonescale path 60 is not fundamental to the present invention, and is beyond the scope of this document. The present invention can be equally applied to any particular cyan tonescale path 60 that is created. As mentioned above, in a preferred embodiment, the cyan tonescale path 60 is used in the raster image processor 10 of FIG. 1, to convert the image data to the CMYKcm color space of the printer, and is preferably created as described in commonly assigned U.S. patent application Ser. No. 09/455,981 filed Dec. 6, 1999 by Couwenhoven et al., the disclosure of which is herein incorporated by reference. Thus, the cyan tonescale path 60 of FIG. 4 describes the combinations of light and dark cyan ink that will exist in the input code values i(x,y,c) that are input to the ink depletion processor 20 of FIG. 1.

Consider now that for a given pixel, a set of input code values i(x,y,c) is encountered that has 8 bit integer values of {102, 255, 215, 0, 140, 100} for C, M, Y, K, c, m, respectively. This set of input code values represents a color that has high amounts of magenta and yellow ink, medium amounts of cyan, light cyan, and light magenta ink, and no black ink. Without loss of generality, it will be assumed for illustration purposes that the volume of ink produced by the inkjet printer is linearly related to the input code value i(x,y,c). This condition is met, in fact, for any binary inkjet printer, and can be made to occur by employing a volumetric linearization technique such as is described in commonly assigned U.S. patent application Ser. No. 09/881,460 filed Jun. 14, 2001 by Couwenhoven et al., the disclosure of which is herein incorporated by reference. Under this condition, as understood by one skilled in the art, the total input colorant amount (which equates to the volume of ink placed on the page at this pixel) can be estimated by adding up the code values for each color channel. Thus, if a code value of 255 equates to a given volume of ink, say, 10 pl (where pl=picoliter, or $10^{-12}$ liter), then the given set of code values (which sums to 812) would produce approximately a total input colorant amount of 31.84 pl (=812/255*10 pl). Assume now that the total colorant amount limit for the given printer, ink set, and receiver media combination is 30 pl per pixel. Thus, 30 pl of ink per pixel can be placed on the page without experiencing image quality artifacts as previously described. The total colorant amount limit will be different for different inks, receiver media, and printer combinations. Typically, the total colorant amount limit is determined for a specific combination by printing a test image target containing solid patches having various amounts of ink, and noting which patches contain image artifacts. The total colorant amount limit is therefore set to the highest value that produces artifact free images. The ink volume corresponding to the current pixel of 31.84 pl exceeds the 30 pl per pixel limit, and therefore the code values for the current pixel need to be modified, or undesirable image artifacts may occur.

Returning to FIG. 4, the light cyan and dark cyan colorant amounts (code values {140, 102}, respectively) corresponding to the pixel under consideration define a point "A", which lies along the cyan tonescale path 60. As defined by point "A", the light and dark cyan amounts together account for 140+102=242 code values, or 9.49 pl of the total volume for the given pixel. However, by examining the density contours and ink volume contours of FIG. 4, it can be seen that any point on the same density contour as point "A" will result in the same density on the page (and therefore substantially the same perceived color by the human eye) as point "A", but that many of these points (i.e., any point to the "left" of point "A" on the same density contour) accomplish this using less ink volume. For example, point "B" corresponds to light and dark cyan code values of roughly {70, 125}, respectively, resulting in the same density as point "A", but only 70+125=195 total code values, or 195/255*10 pl=7.65 pl. Thus, by modifying the light cyan and dark cyan code values from the point "A" original values of {140, 102} to the point "B" modified code values of {70, 125}, a 1.84 pl reduction in total ink volume can be obtained while substantially preserving the original color of the pixel. This brings the total ink volume for the pixel from 31.84 pl down to the acceptable limit of 30 pl. Effectively, the present invention determines modified colorant amounts for the similar colorants responsive to the input colorant amounts, the total input colorant amount, and the total colorant amount limit such that a first colorant amount is removed from a lower density similar colorant and a second colorant amount less than the first colorant amount is added to a higher density similar colorant. So, some of the light cyan ink is "removed" and a smaller amount of dark cyan ink is "added" to preserve the color. Since the light cyan ink is lighter in density than the dark cyan ink, the amount of light cyan ink that is removed is greater than the amount of dark cyan ink that is added. This is why the total ink volume is reduced, and recognition of this point is fundamental to the understanding of the present invention.

Many different ways of modifying the light and dark cyan code values as described above inside the ink depletion processor 20 of FIG. 1 are possible within the scope of the present invention. One embodiment of the present invention includes storing the data for the density contours and ink volume contours in computer memory or a disk file accessible to the ink depletion processor 20, which then retrieves the contour information, and calculates the modified code values by computing the intersection point of the desired ink volume contour and the density contour containing the point defined by the input code values. While this method may be highly accurate, it may be slightly time consuming and overcomplicated for many applications. A preferred embodiment of the present invention would simply compute the average slope of the density contours in the vicinity of the cyan tonescale path 60, and use that average slope as an estimate of the ratio of the light cyan and dark cyan ink densities. This essentially estimates the density contours as a set of straight lines having the average slope. For example, if the average slope of the density contours in the vicinity of the cyan tonescale path 60 is computed as –¼, then this means that 1 code value of dark cyan should be added for every 4 code values of light cyan that are removed. Thus, the modified code values are then computed by finding the intersection of the desired ink volume contour and a line with slope of −¼ that intersects the point defined by the input code values. This is a much simpler and faster way to compute the modified code values. The penalty for this simpler computation is that the perceived color of the modified code values may have some small color error relative to the perceived color of the input code values, since the density contours in general are not perfectly straight lines, especially if large amounts of ink are moved from the light to the dark colorants. However, this color error is generally acceptable given the computational benefits. Additional computational benefit can be gained by only performing the processing described above when the sum of the code values for a given pixel exceeds the sum corresponding to the total colorant amount limit. If the sum of the code values for a given pixel is less than the sum corresponding to the total colorant amount limit, then the given pixel is unlikely to produce undesirable image artifacts, and the input code values are simply passed on to the multitone processor 30 of FIG. 1 unaltered, thus saving the computations described above.

Also worthy of notice in the above particular illustration is that the desired total ink volume was attainable by modifying only the light and dark cyan colorant amounts. However, in this case, the light and dark magenta colorant amounts could also have been modified in a similar manner to provide for some of the total ink volume reduction, and a preferred embodiment of the present invention would take advantage of this. Indeed, there are many input code value combinations where this will be required to achieve the desired total ink volume. Additionally, there are input code value combinations where removing all of the light cyan and light magenta ink and adding corresponding amounts of dark cyan and dark magenta ink will still be insufficient to reduce the total ink volume below the total colorant amount limit. This case will be discussed next.

Figure 5:
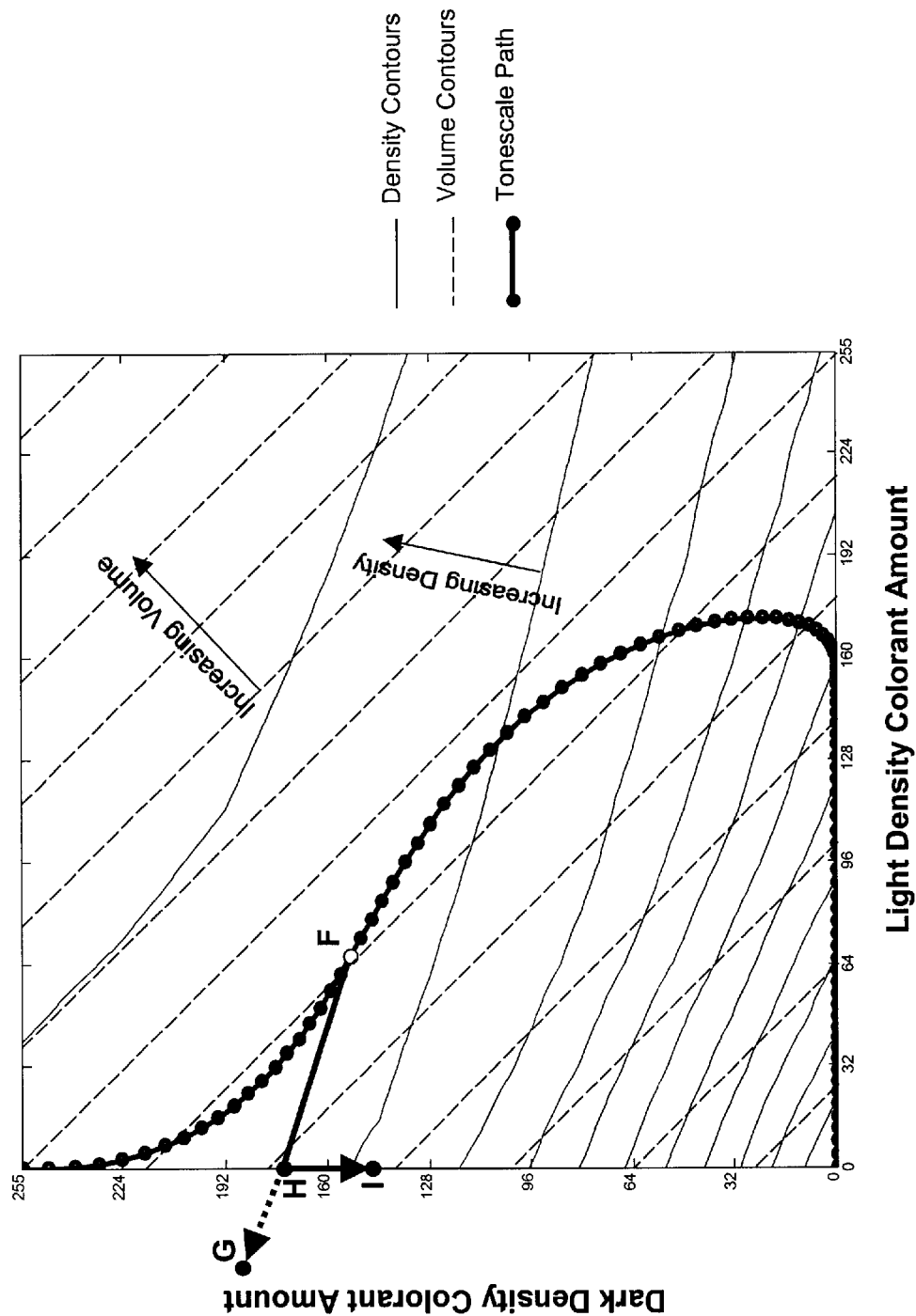
FIG. 5 is another graph showing ink volume and density contours plotted against the light and dark density colorant amounts, and showing an example of ink depletion according to the present invention.

Referring now to FIG. 5, consider a point "F" which lies along the cyan tonescale path 60 and corresponds to light cyan and dark cyan code values of roughly {70, 155}, respectively. Also assume that the set of input code values i(x,y,c) is {155, 255, 255, 223, 72, 0} for C, M, Y, K, c, m respectively. The code values for this pixel sum to 960, and will therefore produce 960/255*10 pl=37.65 pl of ink (assuming that the printer produces 10 pl of ink for a code value of 255, as before). This exceeds the 30 pl per pixel total colorant amount limit used in this example, and therefore the input code values for this pixel need to be modified. If the intersection of the desired density contour and the desired volume contour is computed, the resulting code values are {220, 255, 255, 223, −188, 0} for C, M, Y, K, c, m respectively, corresponding to point "G" of FIG. 5. (Note that point "G" lies outside the boundaries of the graph, and is therefore not drawn to scale, as a light cyan code value of −188 would place it farther to the left.) The sum of these code values is 765, which equates to 30 pl per pixel, and therefore satisfies the total colorant amount limit. However, these code values are invalid, because negative amounts of colorant are not able to be printed, and are therefore undefined. Also, in this case, no light magenta colorant can be removed and added to the dark magenta channel, because the light magenta code value is zero already. Thus, an additional step is required to satisfy the total colorant amount limit using valid code values on the range {0,255} for all channels. To handle this case, a two step process is used. First, as much light cyan ink as possible is removed as possible, which reduces the light cyan code value from 72 to 0. To preserve the color, 72/4=18 code values of dark cyan are added, increasing the dark cyan code value from 155 to 173. This process results in a pixel corresponding to point "H" of FIG. 5, whose code values sum to 906, which equates to 35.53 pl of ink. This results in valid code values for all color channels, but still exceeds the total colorant amount limit of 30 pl per pixel. Thus, a second step is used in which all color channels are multiplied by a constant α (a multiplicative factor), which is computed as the ratio of the desired volume (or sum) to the current volume (or sum). Thus, in this case, α=(765/906)=0.844, and multiplying the code values corresponding to point "H", which are {173, 255, 255, 223, 0, 0} by α produces code values {146, 215, 215, 189, 0, 0}. Plotting the light cyan and dark cyan code values of this set is indicated as point "I" of FIG. 5. Thus, the sum of the modified code values after this step is 765 (equating to 30 pl), which satisfies the total colorant amount limit, and all of the code values are valid on the range {0, 255}.

In a similar fashion to the above example, other cases exist where the amount of colorant that is removed from the light ink channel may be limited by either the light ink code value being reduced to its minimum value of 0 or the dark ink code value being increased to its maximum value of 255 before the desired amount is removed. These cases are handled in a similar fashion to the example above, in which the maximum amount of light ink is removed and added to the dark ink channel, and then the code values are multiplied by a constant α to satisfy the total colorant amount limit as described above.

Figure 6:
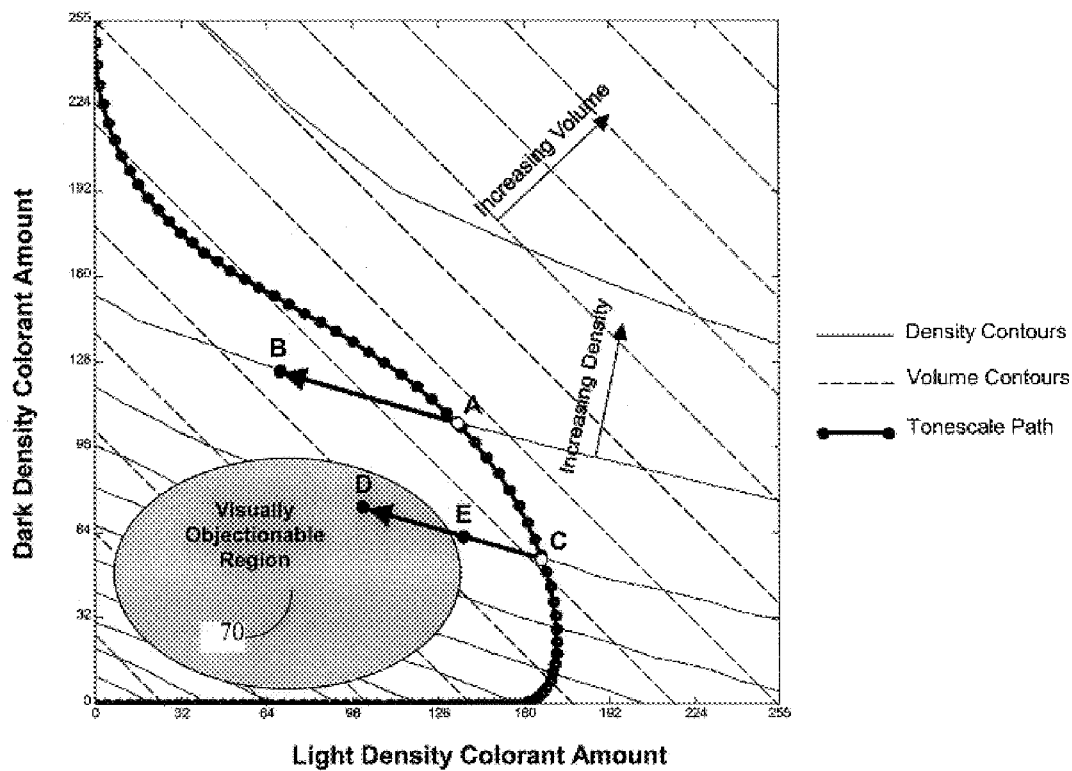
FIG. 6 is a graph showing ink volume and density contours and a visually objectionable region plotted against the light and dark density colorant amounts, and showing an example of ink depletion according to the present invention.

Referring now to FIG. 6, another special case that will be handled by a preferred embodiment of the present invention will be described. In this case, a visually objectionable region 70 is introduced which defines combinations of light cyan and dark cyan ink that are undesirable. Typically, such a region will exist, and generally be situated as shown in FIG. 6. The reason that combinations of light and dark ink that fall within this region are undesirable is that they produce the perception of "noise" or "graininess" when viewed by the human eye. This is mostly due to the fact that colors in this region contain small amounts of both light and dark cyan ink, resulting in a high visibility of the individual ink dots, especially from the dark cyan ink. Thus, printing colors that fall within the visually objectionable region 70 needs to be avoided. The objectionability of these combinations of light and dark ink can, in general, be predicted using a visual objectionability function, which incorporates sophisticated models of the human visual system. These visual objectionability functions are known to those skilled in the art, and have been used in other related fields of image processing, such as digital halftoning algorithms. A preferred embodiment of the present invention will handle this case in the following way. Consider a point "C" that falls on the cyan tonescale path as shown in FIG. 6. Also consider that the code values corresponding to point "C" will produce too much ink at the current pixel, and that the total colorant amount limit can be satisfied by removing some light cyan ink and adding dark cyan ink until point "D" is reached. Since point "D" lies within the visually objectionable region 70, this is not an optimal solution. Instead, a preferred embodiment of the present invention will remove an amount of light cyan ink and add an amount of dark cyan ink to produce the point "E", which lies just outside the visually objectionable region 70 and is on the desired density contour. Since the sum of the code values corresponding to point "E" will still cause the total colorant amount limit to be exceeded, the code values are multiplied by a constant a as described above to satisfy this condition.

Once the code values representing modified colorant amounts that satisfy the total colorant amount limit have been generated according to the present invention as described above, they are passed along to the multitone processor 30 and subsequently the inkjet printer 36 of FIG. 1. The inkjet printer 36 receives the multitoned image signal h(x,y,c), and deposits ink on the page at each pixel location according to the value of the multitoned image signal h(x,y,c) to produce the desired image. All of the pixels in the input digital image are sequentially processed through the image chain of FIG. 1, and sent to the inkjet printer 36, which typically prints the pixels in a raster scanned fashion.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention. In particular, the present invention has been described in the context of an inkjet printer which prints with CMYKcm colorants, but in theory the invention should apply to other types of printing technologies also. Also, the invention can be applied to inkjet printers in which more than two similar colorants are used, such as a printer having a light, medium, and dark cyan (and/or magenta) inks.

PARTS LIST 10 raster image processor
12 digital image data source
20 ink depletion processor
22 total colorant amount limit adjuster
30 multitone processor
36 inkjet printer
40 density contours
42 wireframe mesh
50 ink volume contours
52 wireframe mesh
60 tonescale path
70 visually objectionable region

What is claimed is:

1. A method of computing colorant amounts to be used to make colored pixels in an image, comprising the steps of:
   a) determining a total colorant amount limit of colorant that can be applied to form the pixel;
   b) initially determining the amount of a lower density colorant and an amount of a higher density colorant to be used for a pixel wherein such colorants are similar; and
   c) deciding when the combined amount of colorants computed in step b) exceeds the total colorant amount limit and substituting higher density colorant in place of an amount of a portion of the lower density colorant so that the total colorant amount limit is not exceeded, but the pixel will have substantially the same color when viewed by an observer.

2. A method for modifying an input image having an (x,y) array of pixels suitable for printing on a digital printer having two or more colorants, wherein at least two of the colorants are similar having substantially the same color but different densities, and wherein each pixel has input code values representing input colorant amounts of said two or more colorants, to form an output image with pixels representing modified colorant amounts subject to a total colorant amount limit, comprising the steps of:
   a) determining a total input colorant amount for a pixel responsive to the input colorant amounts of said two or more colorants;
   b) determining modified colorant amounts for the similar colorants responsive to the input colorant amounts, the total input colorant amount, and the total colorant amount limit such that a first colorant amount is removed from a lower density similar colorant and a second colorant amount less than the first colorant amount is added to a higher density similar colorant; and
   c) repeating steps a) and b) for each pixel in the input image.

3. The method of claim 2 wherein the digital printer is an inkjet printer.

4. The method of claim 2 wherein the two or more similar colorants include at least a lower density cyan ink and a higher density cyan ink.

5. The method of claim 2 wherein the two or more similar colorants include at least a lower density magenta ink and a higher density magenta ink.

6. The method of claim 2 wherein the two or more similar colorants include at least a lower density black ink and a higher density black ink.

7. The method of claim 2 wherein the two or more similar colorants include at least a lower density yellow ink and a higher density yellow ink.

8. The method of claim 2 wherein the total colorant amount for a pixel is computed as the sum of the input code values for the pixel.

9. The method of claim 2 wherein the modified colorant amounts for the similar colorants are determined such that a perceived color of the pixel is substantially preserved.

10. The method of claim 2 wherein the modified colorant amounts for the similar colorants are computed responsive to the total colorant amount, the total colorant amount limit, and a ratio of the lower density and the higher density.

11. The method of claim 2 wherein the modified colorant amounts for the similar colorants are computed responsive to a visual objectionability function.

12. The method of claim 2 wherein the modified colorant amounts are computed such that the sum of the modified colorant amounts is less than or equal to the total colorant amount limit.

13. The method of claim 2 wherein step (b) further includes the steps of:
   i) computing a total modified colorant amount as the sum of the modified colorant amounts; and
   ii) for pixels where the total modified colorant amount is greater than the total colorant amount limit, further reducing the modified colorant amounts in proportion by a multiplicative factor which is computed to ensure that the total colorant amount limit is satisfied.

14. The method of claim 2 wherein the modified colorant amounts are only determined for pixels where the total input colorant amount exceeds the total colorant amount limit.

15. A computer program product having instructions stored thereon for causing a computer to perform the method of claim 2.

* * * * *